UNITED STATES PATENT OFFICE.

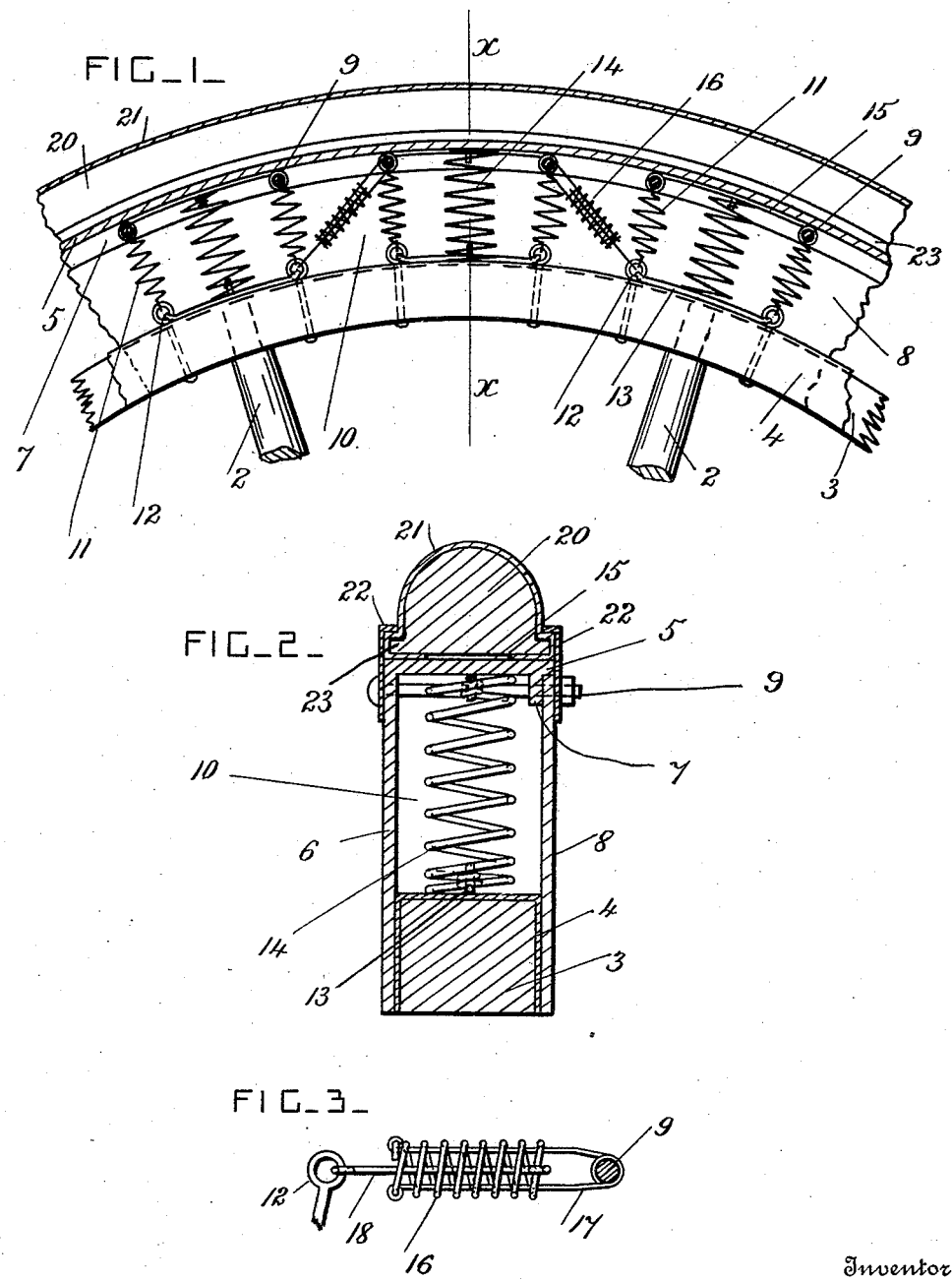

WILLIAM J. PETERSON, OF MACY, NEBRASKA.

SPRING-WHEEL.

1,066,047. Specification of Letters Patent. Patented July 1, 1913.

Application filed November 27, 1912. Serial No. 733,823.

*To all whom it may concern:*

Be it known that I, WILLIAM J. PETERSON, a citizen of the United States, residing at Macy, in the county of Thurston and State of Nebraska, have invented certain new and useful Improvements in Spring-Wheels; and I do hereby declare the following to be a full, clear, and exact description of the invention, such as will enable others skilled in the art to which it appertains to make and use the same.

This invention relates to spring road wheels for all kinds of vehicles and automobiles; and it consists in the novel construction and combination of the parts hereinafter fully described and claimed.

In the drawings, Figure 1 is a side view of a portion of a wheel constructed according to this invention, with the outer plate on one side removed. Fig. 2 is a cross-section taken on the line $x$—$x$ in Fig. 1. Fig. 3 is a detail view of a spring.

The wheel is provided with spokes 2, and a felly 3 is secured to the spokes. The felly is preferably formed of wood, and is covered with a metallic sheathing 4.

The wheel is provided with a metallic outer rim 5 having a side plate 6 on one side, and a flange 7 on the other side. An annular side plate 8 is secured against the flange 7 by means of bolts 9 which also pass through the side plate 6 on the inner side of the rim 5. The two side plates 6 and 8 overlap and bear against the felly 3 and its sheathing, and an annular spring chamber 10 is formed between the felly and the channel-shaped outer rim.

Helical springs 11 are provided and engaged at one end with the bolts 9, and at the other end with eyes 12 secured to the felly. Helical springs 14 are also arranged radially, in the spring chamber, and their ends bear against the felly and against the outer rim, and are held in place by means of distance-pieces 15 and 13. These distance-pieces are formed of wire and they are connected to the two nearest bolts 9 and to the two nearest eyes 12 respectively.

Every two springs 11 having the distance-pieces 15 and 13 extending between them, are held to constitute a pair of springs for the purpose of description, and the springs 14 are arranged in these pairs of springs.

Diagonally arranged helical springs 16 are provided in the spring chamber, in the spaces not occupied by the radial springs 14. The springs 16 are arranged between the pairs of springs 11. The springs 16 are inclined alternately in opposite directions, and they are provided with long U-shaped loops 17 and 18. These loops are pivoted to the bolts 9 and to the eyes 12, and they extend longitudinally in opposite directions through the springs and are secured to their end coils.

The springs 11 are arranged in tension, and the springs 14 are arranged in compression. The springs 16 work both in compression and tension, and they limit the circumferential movements of the outer rim with respect to the felly.

The outer rim is provided with a suitable tire, and a solid tire 20 of india rubber is preferably used. This tire is provided with a tire cover 21 of any suitable flexible material, and it is secured to the outer rim by means of clips 22 which engage with the bolts 9 and with flanges 23 which extend circumferentially around the tire 20. These clips 22 can be continuous rings, or they may be a series of segments, as found convenient.

A spring wheel constructed in this manner enables the vehicle to run smoothly over rough roads, and is less easily destroyed than a wheel provided with a pneumatic tire.

What I claim is:

1. In a spring wheel, the combination, with a felly, and an outer rim provided with side plates which straddle the felly, an annular spring chamber being formed between the felly and rim; of radial tension springs arranged in pairs in the spring chamber between the felly and the rim, radial compression springs arranged in the pairs of tension springs and bearing against the felly and the rim, and diagonal tension and compression springs combined arranged between the pairs of tension springs and inclined in opposite directions alternately and connected to the felly and rim.

2. In a spring wheel, the combination, with a felly, and an outer rim provided with side plates which straddle the felly, an annular spring chamber being formed between the felly and rim; of bolts passing crosswise through the side plates, eyes secured to the felly, radial tension springs arranged in pairs in the spring chamber and secured to the said bolts and eyes, distance-pieces secured between each pair of bolts and between each pair of eyes, radial compression springs connected to the middle parts of the distance-pieces and arranged in the pairs of tension springs, and diagonal tension and compression springs combined arranged between the pairs of tension springs and secured to the said eyes and bolts and inclined in opposite directions alternately.

3. In a spring wheel, the combination, with a felly, and an outer rim provided with side plates which straddle the felly, an annular spring chamber being formed between the felly and rim; of radial tension springs arranged in pairs in the spring chamber between the felly and the rim, bolts passing crosswise through the side plates and having the outer ends of the tension springs secured to them, a tire encircling the outer rim and provided with flanges, a tire cover for the tire, clips secured to the projecting end portions of the said bolts and securing the tire and the tire cover to the rim, radial compression springs arranged in the pairs of tension springs and bearing against the felly and the rim, and diagonal tension and compression springs combined arranged between the pairs of tension springs and inclined in opposite directions alternately and connected to the felly and rim.

In testimony whereof I have affixed my signature in the presence of two witnesses.

WILLIAM J. PETERSON.

Witnesses:
 CHAS. W. BOUGHN,
 NEVA BOUGHN.

---

Copies of this patent may be obtained for five cents each, by addressing the "Commissioner of Patents, Washington, D. C."